Figure 1:
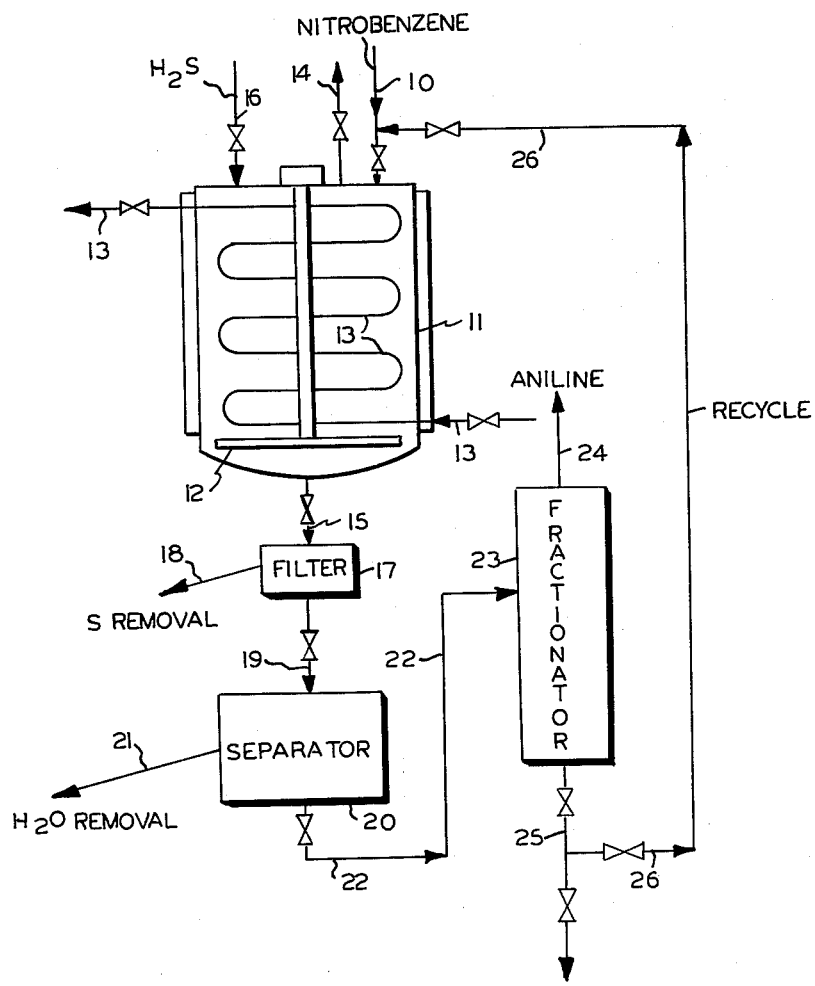

United States Patent Office 3,255,252
Patented June 7, 1966

3,255,252
PROCESS OF REDUCING NITRO COMPOUNDS TO THE CORRESPONDING AMINES
Daniel H. Gold, Plainfield, N.J., assignor to The Lummus Company, New York, N.Y., a corporation of Delaware
Filed Mar. 25, 1963, Ser. No. 267,408
13 Claims. (Cl. 260—570)

This invention has to do with reduction of a nitro group of an organic compound. More specifically, the invention has to do with a process—and particularly a continuous process—for forming amines from related nitro compounds.

For more than a century, it has been known that an aromatic nitro compound such as nitrobenzene can be converted to the corresponding aromatic amine, as analine. For example, in such early work, nitrobenzene was dissolved in aqueous alcoholic ammonia and a stream of gaseous hydrogen sulfide was passed through the nitrobenzene solution. Later, alkaline sulfides typified by sodium sulfide were reacted with nitrobenzene to form aniline. Since considerable losses of desired amine product were experienced with such processes by virtue of side reactions, other techniques were developed. Primarily, in more recent years, reduction of nitro groups of aromatic compounds has been accomplished by generating hydrogen for reaction with the nitro groups. Metals such as iron have been used together with mineral acids typified by hydrochloric acid, for use with nitrobenzene and corresponding nitro compounds. In the latter reaction system, the highly corrosive nature of the mineral acid has made necessary the use of relatively expensive reactors and associated piping to avoid corrosion problems. Also, in related processes wherein hydrogenation catalysts are used, it has been found that the catalysts are readily poisoned by sulfur or sulfur-containing contaminants, making necessary substantially sulfur-free charge materials. For some time, therefore, there has been a need for a reaction system for converting aromatic nitro compounds to the corresponding amine compounds without substantial losses to undesirable by-products and without resort to relatively expensive equipment in which to effect such conversion, or extensive charge purification systems. The present invention is concerned with a new and novel process designed to meet this need.

It is an object of the present invention, therefore, to provide a process for efficiently and effectively reducing a nitro group of an organic nitro compound. Another object is to so convert a nitro group of an aromatic nitro compound to a corresponding amino group. Another object is to provide a process for forming an aromatic amine from an aromatic nitro compound. Another object is to provide a process for effecting such conversion in conventional equipment. Still another object is the provision of a continuous process for effecting such conversion. Particular objects of the invention are the conversions of: nitrobenzene to aniline; a dinitrotoluene to a toluene diamine; and 4,4'-dinitrodiphenylmethane to 4,4'-diaminodiphenylmethane. A further object is to make use of relatively valueless hydrogen sulfide by conversion thereof to a more valuable material, sulfur. Additional objects will be apparent from the following description.

The foregoing objects are realized by reacting an organic nitro compound with hydrogen sulfide, in the absence of alkali and in the presence of certain catalysts, to form an amine.

Nitro compounds contemplated herein for conversion to their corresponding amines are represented by the following general formula:

(I) 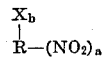

wherein R is a group such as: aryl typified by phenyl, naphthyl, anthryl, phenanthryl, pyryl, chrysyl; and hetero typified by pyridyl, quinolyl, furyl, thienyl; $a$ is an integer from 1 to 3; X is a group such as halogen (chlorine, bromine, iodine, fluorine), hydroxy and esters and ethers thereof, carboxy (COOH) and esters thereof, thioether, sulfonate, alkyl, aryl, cycloalkyl, amino, substituted amino; and $b$ is selected from zero and an integer from 1 to 6. Typical of such nitro compounds are the following:

Nitrobenzene
Nitrotoluenes
Dinitrobenzenes
Trinitrobenzenes
Dinitrotoluenes
Trinitro-tertiary butyl-toluene
Nitrophenol
Bromonitrobenzene
Chloronitrobenzene
Nitrobenzoic acids
Trinitrophenol (picric acid)
Nitrocinnamic acids
Nitrodiphenic acids
Dinitrodiphenic acids
Nitromandelic acid
Nitronaphthalenes, alpha and beta
Di-, tri- and tetra-nitronaphthalenes
Mono- and di-nitronaphthols
Nitroanthracenes
Nitrophenanthrenes
Dinitrodiphenylmethanes
Nitrofurane
Nitrothiophenes
Nitroquinolines
Nitroisoquinolines Preferred herein for reaction are nitrobenzene and dinitrotoluenes, and dinitrodiphenylmethanes.

Amines formed from the foregoing nitro compounds are represented by general Formula II:

(II) 

wherein $c$ is selected from zero, and integers 1 and 2; $d$ is an integer from 1 to 3; and R, X, and $b$ are as defined in connection with general Formula I. Representative of such amines are those listed below:

Aniline
Toluidines
Phenylenediamines
Aminophenols
Nitroanilines
Dinitroanilines
Chloroanilines
Bromoanilines
Trichloroanilines
Aminonaphthols
Naphthylamines
Aminofuranes
Aminothiophenes
Aminoquinolines While reduction of nitro compounds is broadly contemplated herein, the invention is described hereinafter in detail in connection with conversion of nitro aromatic compounds to amines.

Hydrogen sulfide is used herein to reduce a nitro group of an aromatic compound (I) above. The sulfide can be used as a substantially pure gas or can be in admixture with other gases such as light hydrocarbons, hydrogen and nitrogen. However, gas streams containing hydrogen sulfide should contain sufficient hydrogen sulfide that the partial pressure of the said sulfide exceeds at least about 10 pounds per square inch absolute, lest excessive diluent retard formation of the desired amine product and make necessary use of excessively large quantities of gas charged for reaction with the nitro compound.

From studies made herein of the reaction between an aromatic nitro compound (I) and hydrogen sulfide in accordance with this invention, it appears that one molar proportion of a nitro aromatic compound reacts with three molar proportions of hydrogen sulfide per nitro group to be reduced, as illustrated below:

$$C_6H_5NO_2 + 3H_2S \rightarrow C_6H_5NH_2 + 3S + 2H_2O$$

In general, then, although it is to be understood that the invention is not to be limited to the illustrative reaction, at least about three molar proportions of hydrogen sulfide are charged for each molar proportion of the aromatic nitro compound per nitro group to be reduced. Preferably, a ratio between about 3:1 and about 4:1 is used.

Surprisingly, the initial hydrogen sulfide pressure in the reaction system described hereinafter, is an important factor in initiating the reaction rapidly. It has been found that the initial hydrogen sulfide pressure should be at least about 40 pounds per square inch absolute (p.s.i.a.), and preferably between about 200 and 500 p.s.i.a. for initiation. However, once reaction has been started, it continues advantageously at pressures of the order of 10 to 100 p.s.i.a., particularly 30 to 70 p.s.i.a. Higher pressures are also advantageous; however, higher equipment costs must be met.

Temperature is another important factor in affecting the conversions contemplated herein. Reaction temperatures range from about 50 to about 250° C., with particularly advantageous results being obtained with temperatures from about 125° C. to about 175° C. Reaction time can be varied considerably depending upon the type of operation, namely, batch, semi-continuous or continuous.

As indicated, a nitro compound and hydrogen sulfide can be reacted in batch, semi-continuous or continuous operation. In batch operation, all reaction components are added to a reactor, heated to operating temperature and maintained at such temperature for the desired period of time. In semi-continuous operation all reaction components, other than hydrogen sulfide, are added to a reactor, heated to operating temperature, and hydrogen sulfide is added at a rate substantially equal to the rate of reaction. In continuous operation, all components are added continuously to a reactor, equipped with efficient agitators, and are heated to operating temperature; reaction products are withdrawn continuously at a rate such that a substantially uniform liquid level is maintained in the reactor.

It has been found that the reaction can be catalyzed with certain materials. Both homogeneous and heterogeneous catalysts can be used. Homogeneous catalysts so useful are the product amines themselves represented by general Formula II above. Still other amines can be used including, for example: diethyl and triethyl amines and piperazine. Small amounts, of the order of about 0.1 to about 10 percent by weight of the total reaction charge, are suitable.

A homogeneous catalyst can also be supplied to a reaction charge of aromatic nitro compound and hydrogen sulfide, by adding a portion of a previous reaction product to the charge.

Heterogeneous catalysts used herein are associations of silica and various amphoteric metal oxides, and particularly those of alumina, thoria and zirconia. They can be classified, as active clay, and synthetic alumina-silica, thoria-silica and zirconia-silica catalysts. Preferred of these synthetic catalysts are those which contain an excess of silica with smaller amounts of alumina, thoria and zirconia. The active clay catalysts should conform to these same specifications. A preferred heterogeneous catalyst is an association of 60–95 percent silica with 40–5 percent alumina, and particularly preferred is a 75–25 percent association, in powder form, used in a concentration of about 2 percent by weight of total charge.

Although techniques for conducting batch, semicontinuous and continuous operations are well known to those skilled in the art, a typical procedure is illustrated and described in connection with FIGURE 1. As shown in FIGURE 1, a nitro compound such as nitrobenzene in valved line 10 is charged to pressure vessel 11 which is equipped with suitable heating means (not shown), stirring means 12, cooling coil 13, valved vent 14, and valved discharge line 15. Hydrogen sulfide gas under pressure in valved line 16 is also charged to the pressure vessel as shown. Suitable meters (not shown) can be positioned in lines 10 and 16 to proportion the quantities of reactants, nitrobenzene and hydrogen sulfide. The stirrer 12 is operated while reactants are charged to the autoclave and while reaction is conducted therein. In batch and semicontinuous operations, all inlet and exit lines associated with the vessel 11 are closed when the desired quantities of reactants have been charged thereto. The reactants are maintained at the desired operating conditions of temperature, time and pressure, until completion of reaction is indicated by a final vessel (11) pressure corresponding to the vapor pressure of water (e.g., at 150° C., 70 p.s.i.a.) plus product amine and catalyst amine, if any, at reaction temperature for batch operation or by a zero reading on a gas flow meter (not shown) for semicontinuous operation.

At the completion of either type of operation, vessel 11 is cooled, for example, by passing a coolant such as water through valved cooling coil 13. When the contents of vessel 11 have been cooled to a suitable temperature, residual pressure is vented by opening valved vent 14. Contents of vessel 11 are discharged through exit line 15, to filter 17. Sulfur formed in the reaction is collected on the filter and is removed through the system via line 18 when the product from vessel 11 has been cooled below the freezing point of sulfur. Liquid reaction products pass through filter 17 and valved line 19 to separator 20. In the separator, a water layer and organic layer are formed. The water layer is separated and is taken from the system through line 21. The organic layer is passed through valved line 22 to suitable fractionation means 23, such as a distillation tower. Aniline is removed as an overhead product through valved line 24. Unreacted nitrobenzene can be removed from the system through valved line 25, or can be recycled through valved line 26 to line 10 and vessel 11.

It will be apparent to those skilled in the art that the operations illustrated in FIGURE 1 can be modified to a continuous operation. For example, nitrobenzene, H$_2$S and homogeneous catalyst can be metered continuously into vessel 11 through suitable charge lines as 10 and 16, and product can be withdrawn continuously via line 15, while maintaining a substantially uniform liquid level in vessel 11.

Conversion of nitrobenzene to aniline is illustrated by reference to FIGURE 1. It is to be understood that a polynitro compound such as a dinitro compound can be converted similarly to a corresponding mononitro, monoamine or to the corresponding diamine. Thus a mononitro, monoamine product can be fractionated in unit 23 and removed from the system, or can be recycled, as through line 26, for conversion to the corresponding diamine.

In regard to severity of reaction conditions, it has been discovered that higher ultimate yields are often obtained by adjustment of such conditions to realize more modest conversions than are possible by operating at high conversion levels. Thus, a conversion level of about 40 percent (nitrobenzene to aniline) is most satisfactory, since losses to undesired by-products are encountered by operating at conversion levels substantially above about 40 percent.

The invention is further illustrated in the following typical examples. It is to be understood, however, that the invention is not limited to the reactants, quantities or reaction conditions recited in the examples. Rather, the invention is to be construed in accordance with the description given by this specification and with the subject matter defined by the appended claims.

In the examples, all parts are by weight unless otherwise indicated. Pressures are reported as pounds per square inch absolute.

EXAMPLES

As shown in the tabulation of the examples in Table I batch, semi-continuous and a combination of batch and semi-continuous operations have been made with nitrobenzene for conversion to aniline. In batch operation, liquid components and any solid catalyst were added to an autoclave. The latter is an Autoclave Engineers "Magne-Dash," 300 milliliter, 316 type stainless steel, autoclave equipped with a magnetically-driven turbine type agitator, an agitator baffle plate, a cooling coil, a thermowell, appropriate gas inlet and outlet connectors, and an external radiant heater. The actual autoclave volume, corrected for the auxiliary equipment, is 275 milliliters. The agitator shaft is hollow and has drill holes near the top and bottom thereof to provide increased gas circulation. Agitator speed is measured with a Davidson tachometer. Autoclave temperature is controlled with suitable thermoregulator and is recorded with a recorder. Temperature control is of the order of ±1.5° C.

In batch operation, the autoclave was sealed after liquid and solid components had been charged. The autoclave was then evacuated to about 5 mms., the agitator was set at 1000 r.p.m., and hydrogen sulfide was added to a preselected pressure setting. The hydrogen sulfide gas feed valve was then closed and heating was started.

In semi-continuous operation, hydrogen sulfide addition was made continuous. All other manipulations were the same as with batch operation. The hydrogen sulfide gas feed rate was controlled by adjustment of a needle valve in order to maintain a constant autoclave pressure of 105±3 p.s.i.a.

When the batch and semi-continuous operations were combined, continuous gas feed ($H_2S$) was started after the pressure in the autoclave had fallen to about 105 p.s.i.a.

Completion of a run in the autoclave was indicated by a final autoclave pressure corresponding to the vapor pressure of water at the reaction temperature therein (e.g., at 150° C., 70 p.s.i.a.) for batch operation. For semi-continuous operation, a zero flow reading occurred at completion of a run.

At the completion of a run, the autoclave was cooled rapidly by passing water through the cooling coil. When the contents of the autoclave were at about 20° C., residual pressure was vented from the autoclave. The head of the autoclave was removed and the contents were removed and weighed. Thorough cleaning of the autoclave followed.

The quantity of hydrogen sulfide charged to a batch run was determined by comparison of the pressure of the system at 30° C. with an appropriate calibration curve, which was constructed in the following way. The normal charge of nitrobenzene was introduced into the autoclave, the stirrer started, temperature of the vessel adjusted at 30° C., and hydrogen sulfide was slowly introduced therein until a pressure of 265 p.s.i.a. was reached. The gas ($H_2S$) feed valve was then closed. Attainment of equilibrium was verified when no pressure change occurred during a ten minute time interval. Gas in the autoclave was then slowly vented through a wet test meter. At various pressure levels, venting was stopped, the pressure was allowed to equilibrate, and the data so obtained was plotted as a pressure-volume (moles) calibration curve.

The amount of $H_2S$ charged to a semi-continuous run was evaluated by graphically integrating a plot of time versus rotameter reading, and comparing the plot with a calibration curve of rotameter setting versus gas volume constructed at the same back pressure.

Runs were made with and without added catalyst. The reaction products of aniline, sulfur and water were used in a concentration of 5–25 mole percent. A powder comprising 75 percent silica and 25 percent alumina, was used in a concentration of about 2 percent by weight of the total charge.

Reaction products were emptied from the autoclave at completion of each run. Solid sulfur was separated from the reaction product by filtration. It was then weighed, dried and weighed again. The water layer which separated from an organic layer was separated and weighed. Qualitative identification of aniline in an aniline-nitrobenzene organic layer of reaction product was made with

*Table I*

| Run No. | Type of Run [1] | Catalyst As Charged (gms.) | Time, Minutes [2] | Charge, moles | | Product, moles | | Nitrobenzene Recovered, mole | Yield Aniline, Percent Accountability on Nitrobenzene Charged (Conversion and Recovery) | S, Percent [5] |
|---|---|---|---|---|---|---|---|---|---|---|
| | | | | Nitrobenzene | $H^2S$ | Aniline [3] | Sulfur | | | |
| 1 | B | | 135 | 0.83 | 0.81 | 0.21 | | 0.57 | 96 | |
| 2 | B | 2 $SiO_2$-$Al_2O_3$ | 115 | 0.83 | 0.87 | | | | 94 | |
| 3 | B | 2 $SiO_2$-$Al_2O_3$ | 92 | 0.83 | 0.87 | 0.22 | [6] 0.61 | 0.56 | 94 | 92 |
| 8 | B+S | 2 $SiO_2$-$Al_2O_3$ | 251 | 0.83 | 2.00 | 0.61 | 1.70 | 0.05 | 80 | 93 |
| 4 | B | 5.1 Aniline | 115 | 0.83 | 0.92 | 0.22 | [6] 0.47 | 0.61 | 100 | 71 |
| 5 | B | 5.1 Aniline, 5.25 S, 1.98 $H_2O$ | 100 | 0.83 | 0.92 | 0.21 | [6] 0.60 | 0.61 | 99 | 95 |
| 6 [7] | B | As in Run 5 | 47 | 0.83 | 0.92 | 0.09 | 0.34 | 0.78 | 105 | 129 |
| 7 | B | As in Run 5 | 100 | 0.83 | 0.92 | 0.21 | 0.70 | 0.58 | 95 | 111 |
| 9 | S | 5.1 Aniline | 555 | 0.83 | 0.75 | 0.23 | 0.64 | 0.36 | 71 | 93 |
| 10 | S | 27.9 Aniline, 28.8 S, 10.8 $H_2O$ | 340 | 0.83 | 2.00 | 0.67 | 1.70 | 0.13 | 96 | 85 |
| 11 | S | 10.2 Organic Phase from Run 10. | 240 | 0.83 | 0.89 | 0.14 | 0.61 | 0.47 | 74 | 145 |

[1] B=batch; S=Semicontinuous.
[2] Time at 150° C.
[3] All values have been corrected for aniline charged.
[4] Assumed purity 90%.
[5] Based on 3 atoms S per mole $\phi NH_2$ isolated.
[6] Sulfur analyzed for purity.
[7] Run stopped before completion.

a Perkin Elmer Infrared Spectrophotometer Model No. 237. Quantitative measure of aniline was made with an F & M Model No. 720 gas chromatograph. Before a sample of the organic layer was injected into the chromatograph, a known quantity of toluene was added to the sample to provide an internal standard.

Figure 2:
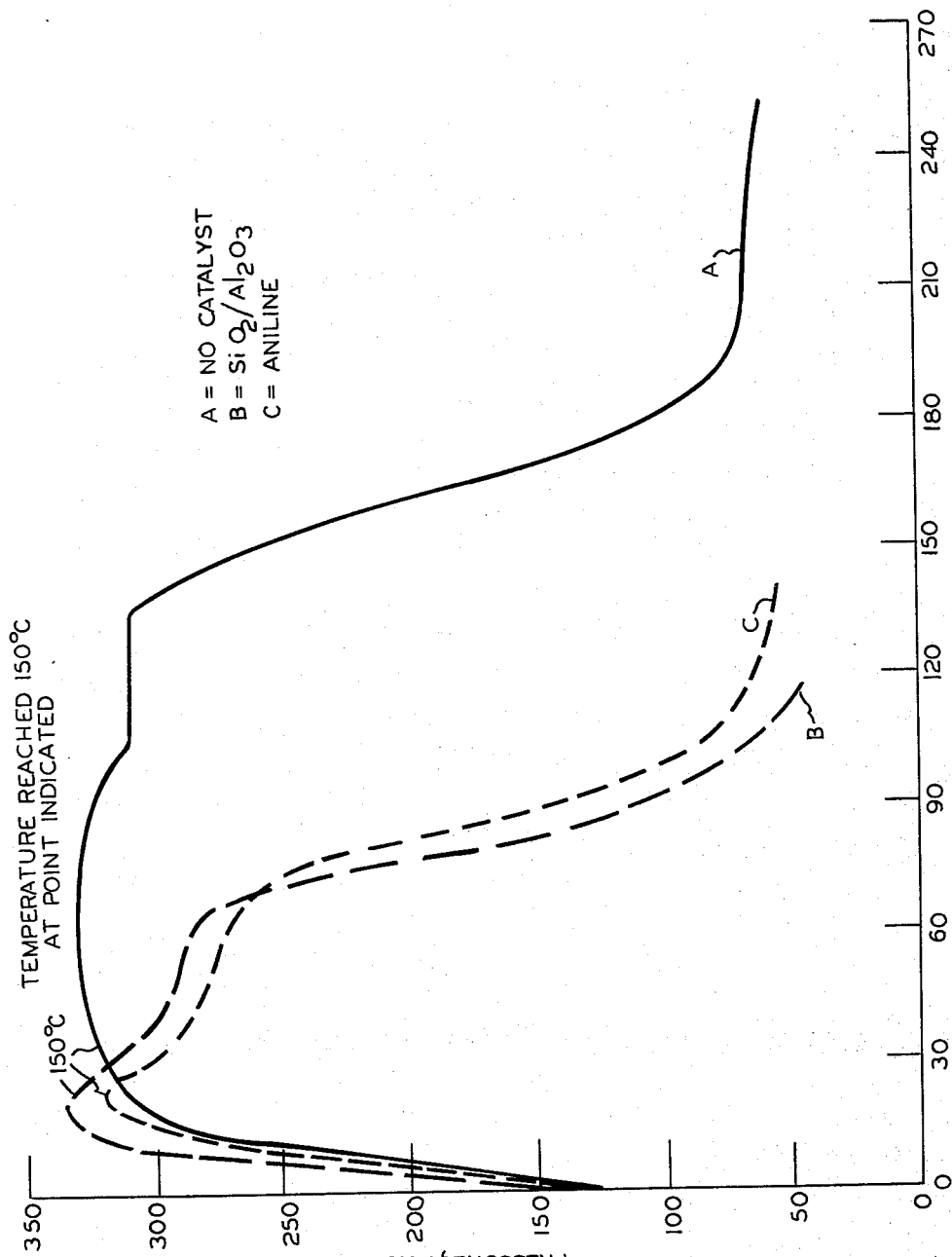
Figure 3:
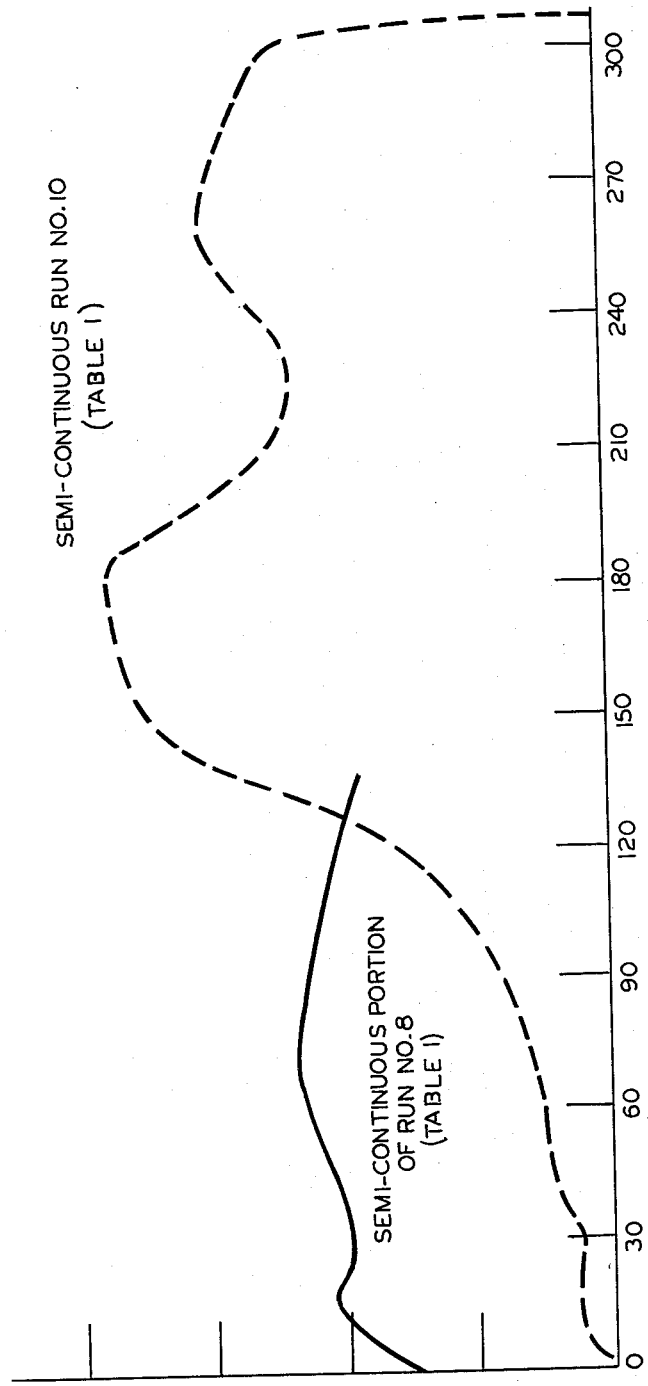

Further examples are shown in FIGURES 2 and 3. In FIGURE 2, three examples of batch runs are illustrated by curves:

A—no catalyst,
B—silica-alumina catalyst added,
C—aniline added.

Curve A of FIGURE 2 shows that the uncatalyzed reaction had an induction period of considerable length of time followed by a substantially rapid reaction. Comparison of curve A with curves B and C reveals that the effect of added silica-alumina and aniline, respectively, is to shorten the induction period, with only a minor effect on reaction rate once the reaction had started.

In FIGURE 3, curve D represents the hydrogen sulfide flow rate as a function of time for the semi-continuous portion of a combination run. Curve E is a plot of the same parameters for a completely semi-continuous run wherein the initial autoclave charge was equivalent to a 24.6 mole percent conversion of nitrobenzene to aniline.

Comparison of curves D and E of FIGURE 3 also indicated the existence of an induction period.

As noted above and as indicated in the foregoing illustrative examples, no added alkali is used in the process of this invention.

By following the procedures shown above for converting nitrobenzene to aniline, a number of related conversions can be realized. The following are provided by way of illustration:

| Nitro compound charged: | Amine product |
|---|---|
| Nitrotoluenes | Nitrotoluidienes, toluene diamines. |
| Dinitrobenzenes | Phenylenediamines. |
| Dinitrodiphenylmethanes | Diaminodiphenylmethanes. |
| Nitrophenol | Aminophenol. |
| Nitronaphthalene | Aminonaphthalene. |
| Nitrothiophene | Aminothiophene. |
| Nitrofurane | Aminofurane. |
| Nitroquinoline | Aminoquinoline. |
| Nitroisoquinoline | Aminoisoquinoline. |

While the invention has been described in detail according to the process contemplated herein, it is to be understood that changes and modifications can be made without departing from the spirit or scope of the invention, and it is intended in the appended claims to cover such changes and modifications.

I claim:

1. The process for reducing a nitro compound to the corresponding amine, the nitro compound being represented by the general formula $$\overset{X_b}{\underset{}{R}}-(NO_2)_a$$

wherein R is selected from the group consisting of phenyl, naphthyl, anthryl, phenanthryl and diphenyl methylene, $a$ is an integer from 1 to 3, X is selected from the group consisting of halogen, hydroxyl, carboxyl, alkyl and amino, and $b$ is a number from 0 to 6, which comprises: reacting one molar proportion of said nitro compound with at least about three molar proportions of hydrogen sulfide, at a temperature between about 50° C. and about 250° C., the initial hydrogen sulfide pressure being at least about 40 pounds per square inch (absolute), in the presence of a catalyst consisting essentially of an association of silica and a metal oxide selected from alumina, thoria and zirconia, whereby the amine is formed.

2. The process defined by claim 1 wherein pressure of the reaction system is maintained between about 10 and 100 pounds per square inch (absolute).

3. The process defined by claim 1 wherein the nitro compound is nitrobenzene and the amine is aniline.

4. The process defined by claim 1 wherein the nitro compound is a dinitrobenzene and the amine is a nitroaniline.

5. The process defined by claim 1 wherein the nitro compound is a dinitrobenzene and the amine is a phenylenediamine.

6. The process defined by claim 1 wherein the nitro compound is a dinitrotoluene and the amine is a toluene diamine.

7. The process defined by claim 1 wherein the amine is 4,4'-dinitrodiphenylmethane and the amine is 4,4'-diaminodiphenylmethane.

8. The process defined by claim 1 wherein the catalyst comprises about 75 percent silica and about 25 percent alumina.

9. The process for reducing nitrobenzene to aniline, which comprises: reacting one molar proportion of nitrobenzene with at least about three molar proportions of hydrogen sulfide, at a temperature between about 125° C. and about 175° C., the initial hydrogen sulfide pressure being between about 200 and about 500 pounds per square inch (absolute), in the presence of a catalyst consisting essentially of an association of about 75 percent silica and about 25 percent alumina, whereby aniline is formed.

10. The continuous process for reducing a nitro compound to the corresponding amine, the nitro compound being represented by the general formula $$\overset{X_b}{\underset{}{R}}-(NO_2)_a$$

wherein R is selected from the group consisting of phenyl, naphthyl, anthryl, phenanthryl and diphenyl methylene, $a$ is an integer from 1 to 3, X is selected from the group consisting of halogen, hydroxyl, carboxyl, alkyl and amine, and $b$ is a number from 0 to 6, which comprises: reacting one molar proportion of said nitro compound with at least about three molar proportions of hydrogen sulfide, at a temperature between about 50° C. and about 250° C., the initial hydrogen sulfide pressure being at least about 40 pounds per square inch (absolute), in the presence of a catalyst consisting essentially of an association of silica and a metal oxide selected from alumina, thoria and zirconia, whereupon a reaction mixture containing the amine, sulfur and water is formed, and continuously removing said reaction mixture.

11. The continuous process of claim 10 wherein unreacted nitro compound present in said reaction mixture is removed therefrom and is recycled for reaction with hydrogen sulfide.

12. The continuous process of claim 10 wherein a portion of said reaction mixture is recycled for reaction with hydrogen sulfide.

13. The continuous process of claim 10 wherein the catalyst comprises about 75 percent silica and about 25 percent alumina.

References Cited by the Examiner

Berkman: "Catalysis," 1940, ed., page 758 (1940).

Houben-Weyl: "Methoden Der Organischen Chemie," Stickstoff-Verbindungen 11, pages 409–11 (1957).

Jozkiewicz et al.: "Chem. Abstracts," vol. 50, pages 214–15 (1956).

Migrdichian: "Organic Synthesis," vol. II, pages 1422–23 (1957).

CHARLES B. PARKER, *Primary Examiner.*